(12) United States Patent
Xu

(10) Patent No.: US 12,119,967 B2
(45) Date of Patent: Oct. 15, 2024

(54) METHOD AND TRANSMITTER FOR CONSTANT ENVELOPE PHASE MODULATION AND DEMODULATION

(71) Applicant: Nanjing Zgmicro Company Limited, Jiangsu (CN)

(72) Inventor: Bin Xu, Nanjing (CN)

(73) Assignee: Nanjing Zgmicro Company Limited, Jiangsu (CN)

( * ) Notice: Subject to any disclaimer, the term of this patent is extended or adjusted under 35 U.S.C. 154(b) by 116 days.

(21) Appl. No.: 18/077,631

(22) Filed: Dec. 8, 2022

(65) Prior Publication Data

US 2023/0114670 A1    Apr. 13, 2023

Related U.S. Application Data

(63) Continuation of application No. PCT/CN2021/094621, filed on May 19, 2021.

(51) Int. Cl.
| | | |
|---|---|---|
| H04L 27/22 | (2006.01) | |
| H04L 1/00 | (2006.01) | |
| H04L 27/20 | (2006.01) | |
| H04L 27/24 | (2006.01) | |
| H04L 27/36 | (2006.01) | |
| H04W 4/80 | (2018.01) | |

(52) U.S. Cl.
CPC ............ *H04L 27/22* (2013.01); *H04L 1/0061* (2013.01); *H04L 27/20* (2013.01); *H04L 27/2071* (2013.01); *H04L 27/24* (2013.01); *H04L 27/361* (2013.01); *H04W 4/80* (2018.02)

(58) Field of Classification Search
CPC ......... H04L 27/22; H04L 27/20; H04L 27/04; H04L 27/361; H04L 1/0061; H04L 27/2071; Y02D 30/70; H04W 4/80
USPC .................. 329/304; 375/298; 455/102, 108
See application file for complete search history.

(56) References Cited

FOREIGN PATENT DOCUMENTS

WO    WO-2016124841 A1 *    8/2016 ............... H03C 1/52

* cited by examiner

*Primary Examiner* — Arnold M Kinkead
(74) *Attorney, Agent, or Firm* — Joe Zheng

(57) ABSTRACT

Techniques for constant envelope phase modulation and demodulation of a wireless signal such as BLE are described. The method comprises: dividing a binary data stream to be transmitted into a plurality of groups of binary data according to a predetermined phase modulation mode, each group of binary data comprising a plurality of bits; mapping the binary data stream into a plurality of phase symbols, wherein each group of binary data is mapped into one phase symbol; modulating a phase sequence composed of the phase symbols into a phase signal using a phase waveform obtained by integrating a predetermined pulse function; and converting the phase signal into two baseband signals by means of a cosine function and a sine function respectively.

20 Claims, 3 Drawing Sheets

METHOD AND TRANSMITTER FOR CONSTANT ENVELOPE PHASE MODULATION AND DEMODULATION

CROSS-REFERENCE OF RELATED APPLICATIONS

The present invention is a continuation of PCT/CN2021/094621, filed on May 19, 2021, which claims the priority of Chinese Patent Application No.: 202010519033.2 filed in China on Jun. 9, 2020, the entire contents of which are incorporated herein by reference.

BACKGROUND OF THE INVENTION

Field of the Invention

The present invention relates to the area of wireless communication, more specifically, to a method and a transmitter for constant envelope phase modulation or demodulation of a wireless signal, such as Bluetooth low Energy (BLE).

Description of the Related Art

Wireless audio technology brings people unrestrained freedom to talk and enjoy music, and has been widely used. In particular, Bluetooth Low Energy (BLE) Audio technology brings people lower power consumption, lower cost and higher quality wireless audio services. However, BLE Audio can only transmit 1 bit in one symbol duration, and a maximum transmission rate is only 2 Mbps, which limits further improvement of wireless audio quality, especially, the wireless transmission of high resolution audio. In order to improve the wireless transmission rate of BLE audio, the symbol duration of Gaussian Frequency Shift Keying (GFSK) modulation used by BLE can be reduced. However, the shorter the symbol duration is, the more the bandwidth occupies, the greater the impact of multipath interference is, and the worse the performance of long-range wireless transmission is. Alternatively, a differential phase shift keying (DPSK) modulation used in Classic Bluetooth can also be considered, or, a multi-carrier modulation technique can be used to increase the wireless transmission rate. However, both DPSK modulated signals and multi-carrier modulated signals are different from BLE constant envelope signal and are not suitable for a BLE RF (radio frequency) transmitter.

Therefore, it is necessary to propose an improved technical scheme to solve the above problems.

SUMMARY OF THE INVENTION

The present invention discloses a method and a transmitter for constant envelope phase modulation of BLE, which can improve a wireless transmission rate and a wireless transmission quality.

To achieve the purpose, according to one aspect of the present invention, a method for constant envelope phase modulation of BLE is provided. The method comprises: dividing a binary data stream to be transmitted into a plurality of groups of binary data according to a predetermined phase modulation mode, each group of binary data comprising a plurality of bits; mapping the binary data stream into a plurality of phase symbols, wherein each group of binary data is mapped into one phase symbol; modulating a phase sequence composed of the phase symbols into a phase signal using a phase waveform obtained by integrating a predetermined pulse function; and converting the phase signal into two baseband signals by means of a cosine function and a sine function respectively.

According to another aspect of the present invention, a transmitter for constant envelope phase modulation of BLE is provided. The transmitter comprises: a transmitting data processor configured to provide a binary data stream; a phase mapper configured to divide the binary data stream into a plurality of groups of binary data, and map the groups of binary data into a plurality of phase symbols; a phase waveform generator configured to generate a phase waveform by integrating a predetermined pulse function; a phase signal generator configured to modulate the phase sequence into a phase signal by using the phase waveform; a baseband signal generator configured to convert the phase signal into two baseband signals; an RF signal generator configured to modulate the two baseband signals into two branching RF signals respectively, combine the two branching RF signals to generate an combined RF signal and amplify the combined RF signal by a power amplifier; and an antenna configured to transmit the amplified RF signal.

According to still another aspect of the present invention, a transmitter for constant envelope phase modulation of BLE is provided. The transmitter for constant envelope phase modulation of BLE comprises: a transmitting data processor configured to provide a binary data stream; a phase mapper configured to divide the binary data stream into a plurality of groups of binary data, and map the groups of binary data into a plurality of phase symbols; a digital phase waveform generation unit configured to generate a digital phase waveform by integrating a predetermined pulse function; a digital phase signal generator configured to modulate the phase sequence into a digital phase signal by using the digital phase waveform, or generate the digital phase signal based on a pre-stored waveform data; a digital baseband signal generator configured to convert the digital phase signal into two digital baseband signals; a digital-to-analog conversion unit configured to convert the two digital baseband signals into two analog baseband signals respectively; an RF signal generator configured to modulate the two analog baseband signals into two branching RF signals respectively, combine the two branching RF signals to generate an combined RF signal and amplify the combined RF signal by a power amplifier; and an antenna configured to transmit the amplified RF signal.

In the present invention, a constant envelope phase modulation technique and corresponding phase demodulation technique are used in BLE wireless signal transmission to improve the wireless transmission rate. In addition, a larger symbol duration is maintained to reduce the effect of multipath interference, thus improving the wireless transmission quality.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

Figure 1:
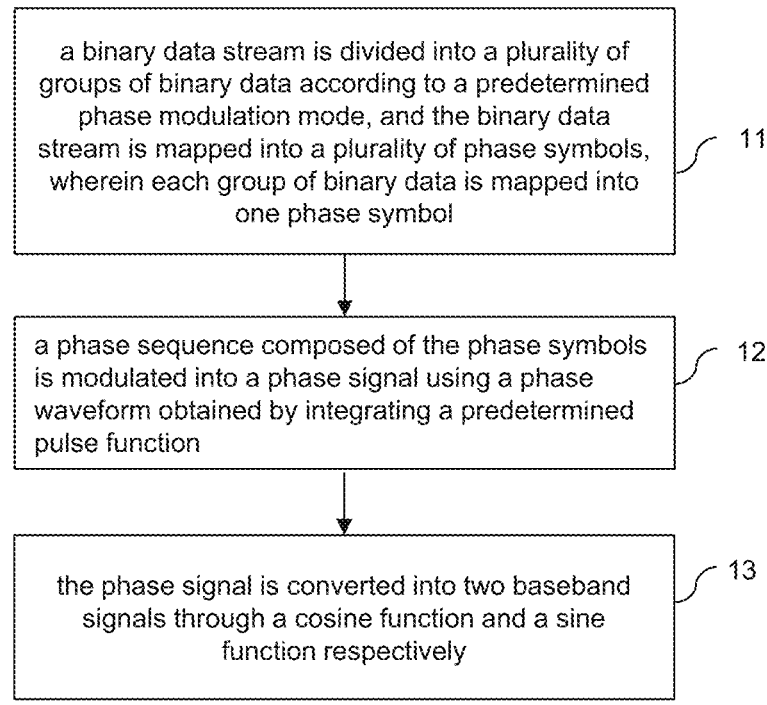
FIG. 1 is a flowchart of a method for constant envelope phase modulation of BLE according to one embodiment of the present invention.

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

As mentioned earlier, Bluetooth Low Energy (BLE) audio technology brings lower power consumption, lower cost and higher quality wireless audio services. However, its maximum transmission rate is relatively low, which limits the improvement of wireless audio quality. In traditional technologies, in order to improve the wireless transmission rate of BLE, a symbol duration of GFSK modulation adopted by BLE can be reduced. However, the shorter the symbol duration in the modulation is, the larger the bandwidth occupied, and the greater the impact of multipath interference is, the worse the performance of long-distance wireless transmission is. Alternatively, a differential phase shift keying (DPSK) modulation used in Classic Bluetooth can also be considered, or, a multi-carrier modulation technique can be used to increase the wireless transmission rate. However, both DPSK modulated signals and multi-carrier modulated signals are different from BLE constant envelope signals and are not suitable for a BLE RF (radio frequency) transmitter.

To solve this problem, the present invention uses a constant envelope phase modulation technique and corresponding phase demodulation technique in BLE transmission to improve a wireless transmission rate while maintaining a larger symbol duration to reduce the effect of multi-path interference, thus improving the wireless transmission quality.

A main idea of a method for wireless signal constant envelope phase modulation of BLE used in the present invention is to convert a high-rate binary data stream into a low-rate phase sequence, modulate the phase sequence into a phase signal using a phase waveform obtained by integrating a predetermined pulse function, convert the phase signal into two baseband signals, generate two branching RF signals based on the two baseband signals, and then combine the two branching RF signals to obtain a RF signal to be transmitted. In addition to increasing the wireless transmission rate and reducing the effect of multi-path interference, the signal modulated by the method in the present invention is also convenient to be decomposed into two signals for further processing when demodulation is performed.

FIG. 1 is a flowchart of a method for constant envelope phase modulation of BLE according to one embodiment of the present invention. As shown in FIG. 1, the method comprises following operations. At 11, a binary data stream to be transmitted is divided into a plurality of groups of binary data according to a predetermined phase modulation mode, and the binary data stream is mapped into a plurality of phase symbols. Each group of binary data comprises a plurality of bits, and is mapped into one phase symbol.

In a specific implementation, a phase modulation used in the present invention is a Constant Envelope Phase Modulation (CEPM), in which the binary data stream $\{b_n\}$ needs to be grouped first, and then the groups of binary data are mapped into a phase sequence $\{\theta_k\}$. In one embodiment, the constant envelope phase modulation of the present invention can use one of π/4 QPM and π/8 8 PM. In the quadrature phase modulation π/4 QPM, every two bits in the binary data stream are divided into one group. In the 8-phase modulation π/8 8 PM, every three bits in the binary data stream are divided into one group.

In these two modulations, a mapping relationship between the binary data stream $\{b_n\}$ and the phase sequence $\{\theta_k\}$ can be shown in Table 1 and Table 2 respectively.

TABLE 1

π/4 QPM mapping table

| $b_{2k}$ | $b_{2k+1}$ | $\theta_k$ |
|---|---|---|
| 0 | 0 | +π/4 |
| 0 | 1 | +3π/4 |
| 1 | 1 | −3π/4 |
| 1 | 0 | −π/4 |

TABLE 2

π/8 QPM mapping table

| $b_{3k}$ | $b_{3k+1}$ | $b_{3k+2}$ | $\theta_k$ |
|---|---|---|---|
| 0 | 0 | 0 | +π/8 |
| 0 | 0 | 1 | +3π/8 |
| 0 | 1 | 1 | +5π/8 |
| 0 | 1 | 0 | +7π/8 |
| 1 | 1 | 0 | −7π/8 |
| 1 | 1 | 1 | −5π/8 |
| 1 | 0 | 1 | −3π/8 |
| 1 | 0 | 0 | −π/8 |

At 12, a phase sequence composed of the phase symbols is modulated into a phase signal using a phase waveform obtained by integrating a predetermined pulse function.

In one embodiment, in order to obtain better spectral characteristics or lower out-of-band spectrum, the phase waveform can be obtained by integrating the predetermined pulse function and normalizing. A mathematical expression of the phase waveform p(t) is as follows:

$$p(t) = \begin{cases} 0 & t < 0 \\ \dfrac{\int_0^t y(x)dx}{\int_0^T y(x)dx} & 0 \le t \le T \\ 1 & t > T \end{cases} \quad \text{(EQ. 01)}$$

A mathematical expression of the predetermined pulse function y(t) is as follows:

$$y(t) = \begin{cases} \dfrac{1 + \cos\left[\dfrac{2\pi t}{T(1-\beta)} + \pi\right]}{2} & 0 \le t < \dfrac{T}{2}(1-\beta) \\ 1 & \dfrac{T}{2}(1-\beta) \le t \le \dfrac{T}{2}(1+\beta), \\ \dfrac{1 + \cos\left[\dfrac{2\pi(T-t)}{T(1-\beta)} + \pi\right]}{2} & \dfrac{T}{2}(1+\beta) < t \le T \end{cases} \quad \text{(EQ. 02)}$$

wherein $0 \le \beta < 1$ and T is the symbol duration.

The obtained phase waveform is utilized by subsequent modulation operations.

In one embodiment, a mathematical expression of the phase signal φ(t) modulated by the constant envelope phase modulation CEPM is:

$$\varphi(t) = \Sigma \theta_k * p(t - k*T) \quad \text{(EQ. 03)}$$

wherein $\{\theta_k\}$ is the phase sequence, $\theta_k$ is the phase symbol, p(t) is the phase waveform, T is a symbol duration, t is a time, and k is a sequence number of the phase symbol.

At 13, the phase signal is converted into two baseband signals through a cosine function and a sine function respectively.

In one embodiment, a mathematical expression of the baseband signal modulated by CEPM is:

$$v(t) = A * e^{j \times \varphi(t)} = A * \{\cos[\varphi(t)] + j*\sin[\varphi(t)]\} = I_B(t) + j*Q_B(t) \quad \text{(EQ. 04)}$$

wherein, A is a signal amplitude, $I_B(t) = A*\cos[\varphi(t)]$, $Q_B(t) = A*\sin[\varphi(t)]$, $I_B(t)$ and $Q_B(t)$ are the two baseband signals obtained by converting the phase signal.

After the two baseband signals are obtained, the RF signal to be transmitted through an antenna finally can be obtained by a conversion between the baseband signals and the RF signal. According to one embodiment, the conversion and transmitting process comprises following operations.

First, the two baseband signals are modulated into two branching RF signals respectively. The two branching RF signals $I_R(t)$ and $Q_R(t)$ are:

$$I_R(t) = I_B(t)*\cos(2\pi*F_c*t), Q_R(t) = -Q_B(t)*\sin(2\pi*F_c*t),$$

wherein $F_c$ is a RF carrier frequency, $I_B(t)$ and $Q_B(t)$ are the two baseband signals.

Next, the two branching RF signals are combined to generate the RF signal to be transmitted. In one embodiment, the RF signal S(t) to be transmitted is:

$$S(t) = P*\text{Re}[v(t)*e^{j*2\pi*F_c*t}] = P*[I_B(t)*\cos(2\pi*F_c*t) - Q_B(t)*\sin(2\pi*F_c*t)] = P*[I_R(t) + Q_R(t)] \quad \text{(EQ. 05)}$$

wherein P is a RF signal amplification gain.

Finally, the RF signal is transmitted through the antenna.

The present invention also provides a simple phase demodulation method for demodulating the signal modulated by the above modulation method. The phase demodulation method comprises: downconverting a received RF signal to a baseband signal by multiplying the received RF signal by two orthogonal RF carriers with a 90 degree phase difference; sampling the baseband signal that has been frequency and time synchronized to obtain a baseband sampling signal; obtaining a differential signal based on the baseband sampling signal; and demodulating the differential signal to obtain a binary data stream.

In one embodiment, a mathematical expression of the baseband signal $\tilde{v}(t)$ of is:

$$\tilde{v}(t) = \tilde{A}(t)*e^{j*[\varphi(t) + 2\pi*\Delta f(t) + \varepsilon(t)]} + n(t) \quad \text{(EQ. 06)},$$

wherein, $\tilde{A}$ is an amplitude of the received RF signal, n(t) is an additive noise, $\Delta f(t)$ is a residual frequency deviation, $\varepsilon(t)$ is a phase noise.

In one embodiment, the mathematical expression of the baseband sampling signal $\tilde{v}(k*T)$ obtained after sampling the baseband signal is:

$$\tilde{v}(k*T) = \tilde{A}(k*T)*e^{j*[\varphi(k*T) + \varepsilon(k*T)]} + n(k*T) \quad \text{(EQ. 07)},$$

wherein $\varepsilon(k*T)$ is a phase error after frequency synchronization or calibration.

In one embodiment, the mathematical expression of the differential signal $\hat{u}_k$ obtained based on the baseband sampling signal is:

$$\hat{u}_k = \tilde{v}[(k+1)*T]*\tilde{v}^*(k*T) = \hat{A}_k * e^{j*[\varphi((k+1)*T) - \varphi(k*T) + \epsilon_k]} + \hat{n}_k = \hat{A}_k * e^{j*[\theta_k + \epsilon_k]} + \hat{n}_k \quad \text{(EQ. 08)},$$

wherein $$\hat{A}_k = \tilde{A}[(k+1)*T]*\tilde{A}(k*T),$$

$$\theta_k = \varphi[(k+1)*T] - \varphi(k*T),$$

$$\epsilon_k = \varepsilon[(k+1)*T] - \varepsilon(k*T),$$

$$\hat{n}_k = \tilde{A}[(k+1)*T]*e^{j*[\varphi((k+1)*T) + \varepsilon((k+1)*T)]}*n*(k*T) + n[(k+1)*T]*\tilde{A}(k*T)*e^{-j*[\varphi(k*T) + \varepsilon(k*T)]} + n[(k+1)*T]*n*(k*T),$$

where ( )* is a complex conjugate.

In another embodiment, the mathematical expression of the differential signal $\hat{u}_k$ can also be:

$$\hat{u}_k = \hat{A}_k * \cos(\theta_k + \epsilon_k) + j*\hat{A}_k*\sin(\theta_k + \epsilon_k) + \tilde{n}_k' + j*\hat{n}_k^Q = \hat{I}_k + j*\hat{Q}_k \quad \text{(EQ. 09)}$$

wherein $$\hat{I}_k = \hat{A}_k * \cos(\theta_k + \epsilon_k) + \hat{n}_k',$$

$$\hat{Q}_k = j*\hat{A}_k*\sin(\theta_k + \epsilon_k) + j*\hat{n}_k^Q,$$

$$\hat{n}_k = \hat{n}_k' + j*\hat{n}_k^Q.$$

For the RF signal modulated by π/4 QPM modulation, the estimation of the binary data $\hat{b}_{2k}$ and $\hat{b}_{2k+1}$ is obtained according to following equations:

$$\hat{b}_{2k} = \begin{cases} 0, & \hat{Q}_k \ge 0 \\ 1, & \hat{Q}_k < 0 \end{cases}, \quad \text{(EQ. 10a)}$$

and $$\hat{b}_{2k+1} = \begin{cases} 0, & \hat{I}_k \geq 0 \\ 1, & \hat{I}_k < 0 \end{cases}.$$ (EQ. 10b)

For the RF signal modulated by π/8 8 PM modulation, the estimation of the binary data $\hat{b}_{2k}$ and $\hat{b}_{2k+1}$ is obtained according to following equations:

$$\hat{b}_{3k} = \begin{cases} 0, & \hat{Q}_k \geq 0 \\ 1, & \hat{Q}_k < 0 \end{cases},$$ (EQ. 11a)

$$\hat{b}_{3k+1} = \begin{cases} 0, & \hat{I}_k \geq 0 \\ 1, & \hat{I}_k < 0 \end{cases},$$ (EQ. 11b)

$$\hat{b}_{3k+2} = \begin{cases} 0, & |\hat{I}_k| \geq |\hat{Q}_k| \\ 1, & |\hat{I}_k| < |\hat{Q}_k| \end{cases},$$ (EQ. 11c)

wherein ∥ is an absolute value symbol.

Figure 2:
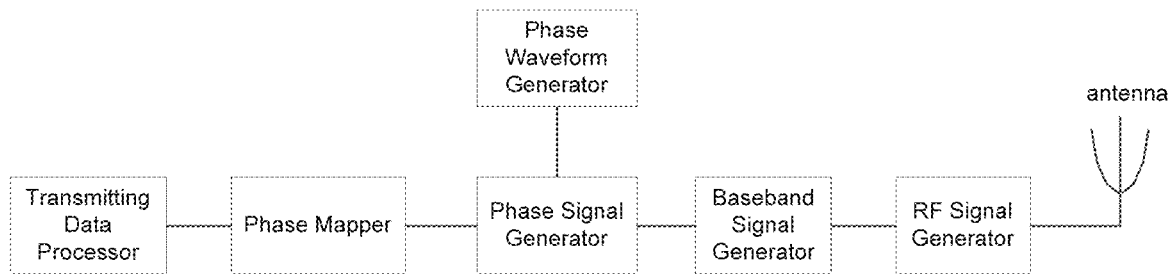
FIG. 2 is a structural diagram of a transmitter for constant envelope phase modulation of BLE according to one embodiment of the present invention.

FIG. 2 is a structural diagram of a transmitter for constant envelope phase modulation of BLE according to one embodiment of the present invention. As shown in FIG. 2, the transmitter is a CEPM (Constant Envelope Phase Modulation) transmitter, and includes a transmitting data processor, a phase mapper, a phase waveform generator, a phase signal generator, a baseband signal generator, a RF signal generator, and an antenna.

The transmitting data processor provides the binary data stream to be transmitted, and perform data encryption, whitening, channel coding, Cyclic Redundancy Check (CRC), etc on the binary data stream. The phase mapper is configured to divide the binary data stream into a plurality of groups of binary data, and map the groups of binary data into a phase sequence consisting of a plurality of phase symbols according to Table 1 or Table 2 mentioned above. The phase waveform generator is configured to generate a phase waveform according to EQ. 01 and EQ. 02. The phase signal generator is configured to generate a phase signal by modulating the phase sequence generated by the phase mapper according to EQ. 03 using the phase waveform. The baseband signal generator is configured to convert the phase signal into two baseband signals $I_B(t)$ and $Q_B(t)$ according to EQ. 04. The generation process of $I_B(t)$ and $Q_B(t)$ is shown in EQ. 04, and includes converting the phase signal into two baseband signals according to a cosine function and a sine function respectively, and then amplifying their amplitudes to A. The RF signal generator is configured to modulate the two baseband signals $I_B(t)$ and $Q_B(t)$ on two orthogonal RF carriers cos(2π*$F_c$*t) and sin (2π*$F_c$*t)) with 90 degrees phase difference according to EQ. 05 to generate two branching RF signals $I_R(t)$ and $Q_R(t)$. The RF signal S(t) is generated by combining the two branching RF signals $I_R(t)$ and $Q_R(t)$ and amplifying the combined RF signal by a power amplifier. Finally, the antenna transmits the RF signal modulated by the RF signal generator.

Figure 3:
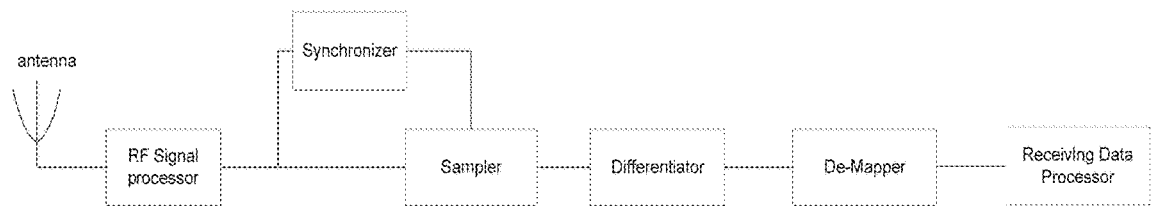
FIG. 3 is a structure diagram of a receiver for constant envelope phase modulation of BLE according to one embodiment of the present invention.

FIG. 3 is a structure diagram of a receiver for constant envelope phase modulation of BLE according to one embodiment of the present invention. As shown in FIG. 3, the receiver is a CEPM receiver, and includes an antenna, a RF signal processor, a synchronizer, a sampler, a differentiator, a de-mapper, and a receiving data processor.

The antenna receives a radio frequency signal from the air. The RF signal processor is configured to downconvert the received RF signal to a baseband signal by multiplying the received RF signal by two orthogonal RF carriers with 90 degree phase difference according to EQ. 06. The RF signal processor may also comprise a bandpass filter, a low noise amplifier, a baseband gain amplifier, a baseband filter, etc., for enhancing the signal and filtering interference and noise. The synchronizer is configured to estimate a frequency deviation between the receiver and the transmitter, and estimate an accurate sampling time. The sampler is configured to calibrate the frequency deviation according to a synchronization signal provided by the synchronizer, and samples the baseband signal at an accurate time point with the symbol duration T as the interval according to EQ. 07 to get a baseband sampling signal. The differentiator is configured to do a differential processing, i.e., complex conjugate multiplication, on the baseband sampling signal with the symbol duration T as the interval according to EQ. 08 and EQ. 09 to obtain two signal sequences $\hat{I}_k$ and $\hat{Q}_k$. The de-mapper is configured to de-map the two signal sequences $\hat{I}_k$ and $\hat{Q}_k$ into a binary data stream according to EQ. 10 or EQ. 11. Finally, the receiving data processor further processes the binary data stream, such as de-whitening, channel decoding, cyclic redundancy check, decryption, and the like.

A packet format of CEPM used in BLE in the present invention is the same as a general BLE packet format, as shown in Table 3. The packet format of CEPM used in BLE comprises a preamble, an access Address, a Protocol Data Unit (PDU) and a Cyclic Redundancy Check (CRC). In one embodiment, the access address is 32 bits and the CRC is 24 bits.

TABLE 3

| Preamble | Access Address | PDU | CRC |
| --- | --- | --- | --- |

Three methods for CEPM of BLE with different transmission rates are provided in the present invention. The three methods for CEPM of BLE are LE E2M, LE H3M and LE H4M respectively.

In one embodiment, the modulation mode used in the LE E2M is a quadrature phase modulation π/4 QPM. During the modulation process in the LE E2M, a value range of β in EQ. 02 is [0, 0.2] is [0, 0.2], the symbol duration T=1 μs, and the transmission rate is 2 Mbps. In the packet format shown in FIG. 3, the access address in the BLE packet is mapped into 16 phase symbols, the protocol data unit in the BLE packet is mapped into 1 to 129 phase symbols, and the cyclic redundancy check in the BLE packet is mapped into 12 phase symbols. In a specific embodiment, the preamble in the BLE packet is set to 16 bits of {00 10 00 10 00 10 10 00 10} and mapped into a phase sequence {+π/4, −π/4, +π/4, −π/4, +π/4, −π/4, +π/4, −π/4, −π/4, −π/4} containing 8 phase symbols.

In one embodiment, the modulation mode used in the LE H3M is the quadrature phase modulation π/4 QPM. During the modulation process in the LE H3M, a value range of β in EQ. 02 is [0, 0.2] is [0, 0.2], the symbol duration T=2/3 μs, and the transmission rate is 3 Mbps. In the packet format shown in FIG. 3, the access address in the BLE packet is mapped into 16 phase symbols, the protocol data unit in the BLE packet is mapped into 1 to 129 phase symbols, and the cyclic redundancy check in the BLE packet is mapped into 12 phase symbols. In a specific embodiment, the preamble in the BLE packet is set to 24 bits of {00 10 00 10 00 10 00 10 00 10 00 10} and is mapped into a phase sequence {+π/4, −π/4, +π/4, −π/4, −π/4, −π/4, +π/4, −π/4, −π/4, +π/4, −π/4, −π/4, −π/4, +π/4, −π/4, −π/4} containing 12 phase symbols.

In one embodiment, the modulation mode used in the LE H4M is 8-phase modulation π/8 8 PM. During the modulation process in the LE H4M, a value range of β in EQ. 02 is [0, 0.2] is [0, 0.2], the symbol duration T=3/4 μs, and the transmission rate is 4 Mbps. In the packet format shown in FIG. 3, the protocol data unit in the BLE packet is mapped into 1~86 phase symbols, and the cyclic redundancy check in the BLE packet is mapped into 8 phase symbols. In a specific embodiment, the preamble in the BLE packet is set to 36 bits of {001 101 001 101 001 101 001 101 001 101 001 101} and mapped into a phase sequence {+3π/8, −3π/8, +3π/8, −3π/8, +3π/8, −3π/8, +3π/8, −3π/8, +3π/8, −3π/8, +3π/8, −3π/8} containing 12 phase symbols. In a specific embodiment, after the access address with 32 bits in the BLE packet is filled with 1 bit to form 33 bits, the 33 bits are mapped into 11 phase symbols.

Figure 4:
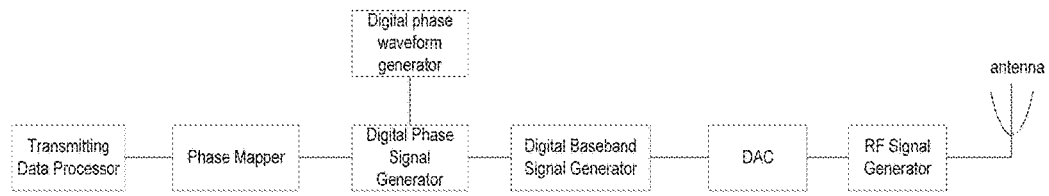
FIG. 4 is a structure diagram of a digital transmitter for constant envelope phase modulation of BLE according to another embodiment of the present invention.

FIG. 4 is a structure diagram of a digital transmitter for constant envelope phase modulation of BLE according to another embodiment of the present invention. As shown in FIG. 4, the digital transmitter comprises a transmitting data processor, a phase mapper, a digital phase waveform generator, a digital phase signal generator, and a digital baseband signal generator, a Digital-to-Analog Converter (DAC), a RF signal generator, and an antenna.

The transmitting data processor provides the binary data stream to be transmitted, and perform data encryption, whitening, channel coding, Cyclic Redundancy Check (CRC), etc on the binary data stream. The phase mapper is configured to divide the binary data stream into a plurality of groups of binary data, and map the groups of binary data in a phase sequence consisting of a plurality of phase symbols according to Table 1 or Table 2 mentioned above. The digital phase waveform generator is configured to generate a digital phase waveform according to EQ. 01 and EQ. 02. The oversampling multiples of the digital phase waveforms of LE E2M, LE H3M, and LE H4M are 48, 32, and 36 respectively. The digital phase signal generator is configured to modulate the phase sequence into a digital phase signal by using the digital phase waveform according to EQ. 03. In one embodiment, the digital phase signal may also be generated based on a pre-stored waveform data, which is also generated and saved as waveform data based on the EQ. 01 and EQ. 02, but not generated in real time.

The digital baseband signal generator converts the digital phase signal into two digital baseband signals according to EQ. 04. Namely, the digital phase signal is converted into two digital baseband signals according to the cosine function and the sine function. The two digital baseband signals are converted to two analog baseband signals $I_B(t)$ and $Q_B(t)$ by the DAC. The RF signal generator is configured to low-pass filter the two analog baseband signals, modulate the two analog baseband signals $I_B(t)$ and $Q_B(t)$ on two orthogonal RF carriers $\cos(2\pi*F_c*t)$ and $\sin(2\pi*F_c*t)$ with 90 degrees phase difference according to EQ. 05 to generate two branching RF signals $I_R(t)$ and $Q_R(t)$. The RF signal S(t) is generated by combing the two branching RF signals $I_R(t)$ and $Q_R(t)$ and amplifying the combined RF signal by a power amplifier. Finally, the antenna transmits the RF signal modulated by the RF signal generator.

Figure 6:
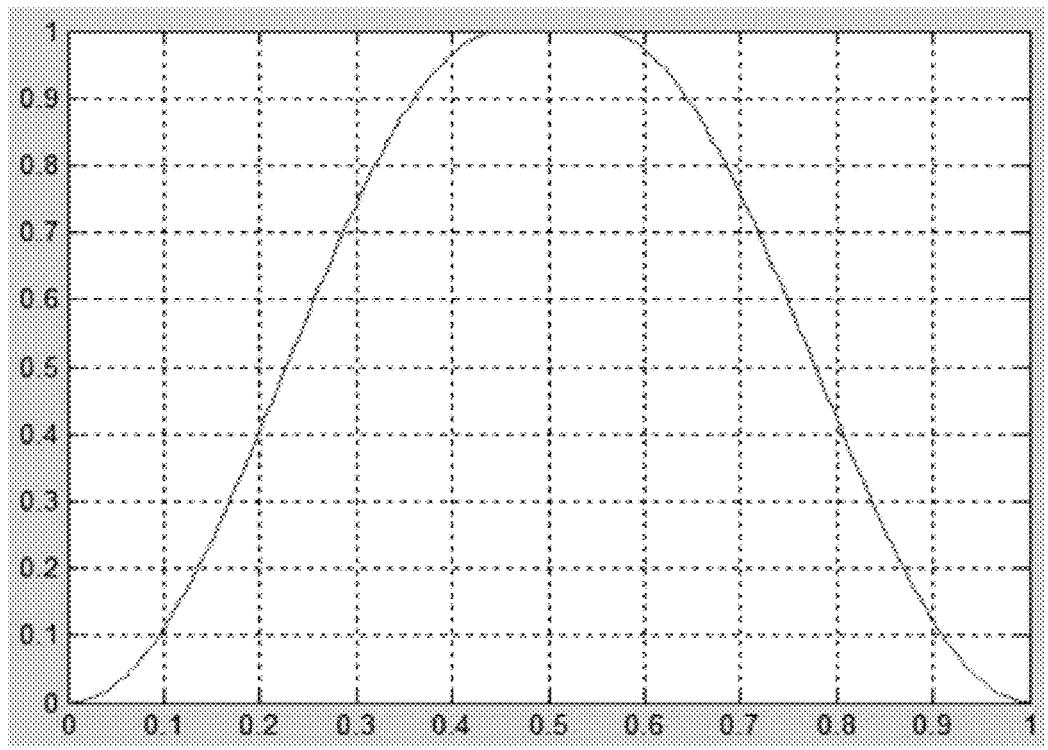
FIG. 6 is a waveform diagram of a predetermined pulse function provided according to one embodiment of the present invention.
Figure 7:
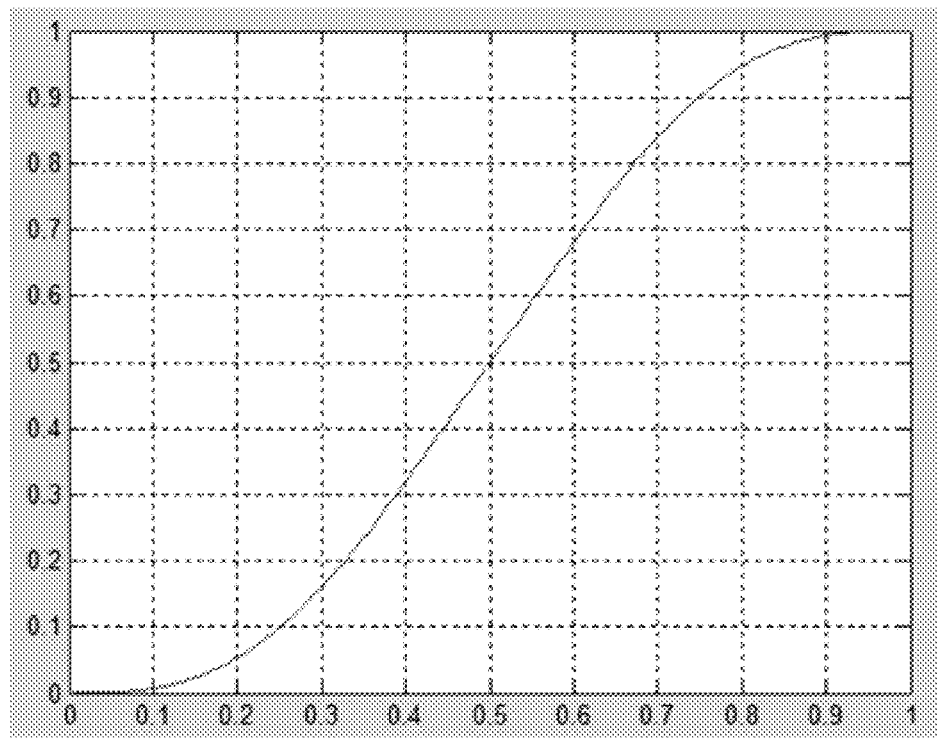
FIG. 7 is a waveform diagram of a phase waveform provided according to one embodiment of the present invention.

FIG. 6 is a waveform diagram of the predetermined pulse function provided according to one embodiment of the present invention. As shown in FIG. 6, it is a pulse waveform of the predetermined pulse function generated according to EQ. 02 used by LE E2M, wherein β=0.2 and T=1 μs. FIG. 7 is a waveform diagram of a phase waveform provided according to one embodiment of the present invention. As shown in FIG. 7, it is the phase waveform generated according to EQ. 01, wherein the pulse function is shown in FIG. 6, β=0.2 and T=1 μs.

Figure 5:
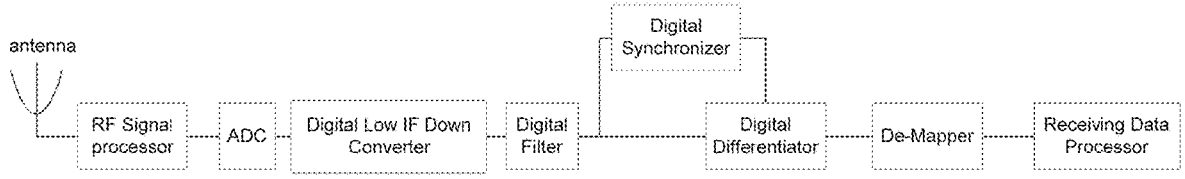
FIG. 5 is the structure diagram of a receiver for constant envelope phase modulation of BLE according to another embodiment of the present invention.

FIG. 5 is the structure diagram of a digital receiver for constant envelope phase modulation of BLE according to another embodiment of the present invention. As shown in FIG. 5, the digital receiver comprises an antenna, a RF signal processor, an Analog-to-Digital Converter (ADC), a digital low intermediate frequency (IF) down converter, a digital filter, a digital synchronizer, a digital differentiator, a de-mapper, a receiving data processor.

The antenna is configured to receive a radio frequency signal. In the RF signal processor, the LE E2M, LE H3M, and LE H4M all use a 2 MHz low IF structure to down-convert the RF signal into a 2 MHz low IF analog complex baseband signal by multiplying the RF signal by two orthogonal RF carriers with a 90 degree phase difference. The RF signal processor can comprise a bandpass filter, a low-noise amplifier, a baseband gain amplifier, and a low-pass or bandpass analog filter to enhance the signal and filter out interference and noise. The ADC is configured to convert the low IF analog complex baseband signal into a digital low IF complex signal. The sampling rate for the analog-to-digital conversion of LE E2M, LE H3M, and LE H4M is 12 MHz, wherein the oversampling multiple of LE E2M is 12, the oversampling multiple of LE H3M is 8, and the oversampling multiple of LE H4M is 9. The digital low IF down-conversion unit is configured to convert the digital low IF complex signal into two digital baseband signals I/Q. The digital filter is configured to low-pass filter the digital baseband signals I/Q to further suppress interference and noise. The digital synchronizer is configured to estimate a frequency deviation and a sampling time deviation of the filtered digital baseband signals I/Q. The digital differentiator is configured to calibrate the frequency deviation and calculate an optimal differential sampling point based on the frequency deviation and the sampling time deviation from the digital synchronizer. The digital differentiator does differential processing, i.e., complex conjugate multiplication, on two digital complex signals spaced at oversampling points (the oversampling multiple of LE E2M is 12, the oversampling multiple of LE H3M is 8, and the oversampling multiple of LE H4M is 9) and obtains the two signal sequences $\hat{I}_k$ and $\hat{Q}_k$ shown in EQ. 09. The de-mapper is configured to de-map the two signal sequences $\hat{I}_k$ and $\hat{Q}_k$ into a binary data stream according to EQ. 10 or EQ. 11. Finally, the receiving data processor further processes the binary data stream, such as de-whitening, channel decoding, cyclic redundancy check, decryption, and the like.

The constant envelope phase modulation method and a corresponding phase demodulation method provided in the present invention improve the wireless transmission rate. A larger symbol period is also maintained to reduce the effect of multi-path interference, thereby improving the wireless transmission quality.

Those skilled in the art should be aware that the embodiments of this application may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (comprising, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes.

These computer program instructions may also be loaded on a computer or other programmable data processing device such that a series of operational operations are performed on a computer or other programmable device to produce computer-implemented processing, thereby providing instructions executed on a computer or other programmable device for implementing a flow chart. The operations of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

I claim:

1. A method for constant envelope phase modulation of BLE, comprising:
dividing a binary data stream to be transmitted into a plurality of groups of binary data according to a predetermined phase modulation mode, each of the groups of binary data including a plurality of bits;
mapping the binary data stream into a plurality of phase symbols, wherein the each of the group of binary data is mapped into one of the phase symbols;
modulating a phase sequence including the phase symbols into a phase signal $\varphi(t)$ using a phase waveform $p(t)$ obtained by integrating a predetermined pulse function $y(t)$, wherein a mathematical expression of the phase waveform $p(t)$ is:

$$p(t) = \begin{cases} 0 & t < 0 \\ \dfrac{\int_0^t y(x)dx}{\int_0^T y(x)dx} & 0 \le t \le T \\ 1 & t > T \end{cases};$$

and
converting the phase signal into two baseband signals by means of a cosine function and a sine function respectively.

2. The method according to claim 1, wherein a mathematical expression of the predetermined pulse function $y(t)$ is:

$$y(t) = \begin{cases} \dfrac{1 + \cos\left[\dfrac{2\pi t}{T(1-\beta)} + \pi\right]}{2} & 0 \le t < \dfrac{T}{2}(1-\beta) \\ 1 & \dfrac{T}{2}(1-\beta) \le t \le \dfrac{T}{2}(1+\beta), \\ \dfrac{1 + \cos\left[\dfrac{2\pi(T-t)}{T(1-\beta)} + \pi\right]}{2} & \dfrac{T}{2}(1+\beta) < t \le T \end{cases}$$

wherein, $0 \le \beta < 1$, T is a symbol duration and t is a time.

3. The method according to claim 1, wherein a mathematical expression of the phase signal $\varphi(t)$ is:

$\varphi(t) = \Sigma \theta_k * p(t - k*T)$, wherein $\{\theta_k\}$ is the phase sequence, $\theta_k$ is the phase symbol, $p(t)$ is the phase waveform, T is a symbol duration, t is a time, and k is a sequence number of the phase symbol.

4. The method according to claim 1, wherein the converting the phase signal into two baseband signals by means of a cosine function and a sine function respectively, comprises:
converting the phase signal into two baseband signals $I_B(t)$ and $Q_B(t)$ by means of a cosine function and a sine function respectively according to following equations:

$I_B(t) = A*\cos[\varphi(t)], Q_B(t) = A*\sin[\varphi(t)]$, wherein $\varphi(t)$ is the phase signal and A is a signal amplitude.

5. The method according to claim 1, wherein the predetermined phase modulation mode is one of a quadrature phase modulation π/4 QPM and an 8-phase modulation π/8 8 PM, and wherein every two bits in the binary data stream are divided into one group in the quadrature phase modulation π/4 QPM, and every three bits in the binary data stream are divided into one group in the 8-phase modulation π/8 8 PM.

6. The method according to claim 5, wherein in the quadrature phase modulation π/4 QPM, the two bits divided into one group are denoted as $b_{2k}$ and $b_{2k+1}$ respectively, and a mapping relationship between the binary data stream $\{b_n\}$ and the phase sequence $\{\theta_k\}$ is that:
when $b_{2k}$ and $b_{2k+1}$ are 0 and 0 respectively, the mapped phase symbol $\theta_k$ is $+\pi/4$,
when $b_{2k}$ and $b_{2k+1}$ are 0 and 1 respectively, the mapped phase symbol $\theta_k$ is $+3\pi/4$,
when $b_{2k}$ and $b_{2k+1}$ are 1 and 1 respectively, the mapped phase symbol $\theta_k$ is $-3\pi/4$, and
when $b_{2k}$ and $b_{2k+1}$ are 1 and 0 respectively, the mapped phase symbol $\theta_k$ is $-\pi/4$, in the 8-phase modulation π/8 8 PM, the three bits divided into one group are denoted as $b_{3k}$, $b_{3k+1}$, and $b_{3k+2}$, a mapping relationship between the binary data stream $\{b_n\}$ and the phase sequence $\{\theta_k\}$ is that:

when $b_{3k}$, $b_{3k+1}$, and $b_{3k+2}$ are 0, 0, and 0 respectively, the mapped phase symbol $\theta_k$ is +π/8, when $b_{3k}$, $b_{3k+1}$, and $b_{3k+2}$ are 0, 0, and 1 respectively, the mapped phase symbol $\theta_k$ is +3π/8, when $b_{3k}$, $b_{3k+1}$, and $b_{3k+2}$ are 0, 1, and 1 respectively, the mapped phase symbol $\theta_k$ is +5π/8, when $b_{3k}$, $b_{3k+1}$, and $b_{3k+2}$ are 0, 1, and 0 respectively, the mapped phase symbol $\theta_k$ is +7π/8, when $b_{3k}$, $b_{3k+1}$, and $b_{3k+2}$ are 1, 1, and 0 respectively, the mapped phase symbol $\theta_k$ is −7π/8, when $b_{3k}$, $b_{3k+1}$, and $b_{3k+2}$ are 1, 1, and 1 respectively, the mapped phase symbol $\theta_k$ is −5π/8, when $b_{3k}$, $b_{3k+1}$, and $b_{3k+2}$ are 1, 0, and 1 respectively, the mapped phase symbol $\theta_k$ is −3π/8, and when $b_{3k}$, $b_{3k+1}$, and $b_{3k+2}$ are 1, 0, and 0 respectively, the mapped phase symbol $\theta_k$ is −π/8.

7. The method according to claim 6, wherein when the predetermined phase modulation mode is the quadrature phase modulation π/4, a value range of β is [0, 0.2], the symbol duration T=1 μs, and a transmission rate is 2 Mbps, an access address in a BLE packet is mapped into 16 phase symbols, a protocol data unit in the BLE packet is mapped into 1 to 129 phase symbols, and a cyclic redundancy check in the BLE packet is mapped into 12 phase symbols, a preamble in the BLE packet is set to 16 bits of {00 10 00 10 00 10 10 00 10} and mapped into a phase sequence {+π/4, −π/4, +π/4, −π/4, +π/4, −π/4, +π/4, −π/4, −π/4, −π/4} containing 8 phase symbols.

8. The method according to claim 6, wherein when the predetermined phase modulation mode is the quadrature phase modulation π/4, a value range of β is [0, 0.2], the symbol duration T=2/3 μs, and a transmission rate is 3 Mbps, an access address in a BLE packet is mapped into 16 phase symbols, a protocol data unit in the BLE packet is mapped into 1 to 129 phase symbols, and a cyclic redundancy check in the BLE packet is mapped into 12 phase symbols, a preamble in the BLE packet is set to 24 bits of {00 10 00 10 00 10 00 10 00 10 00 10} and mapped into a phase sequence {+π/4, −π/4, +π/4, −π/4, +π/4, −π/4, +π/4, −π/4, +π/4, −π/4, +π/4, −π/4} containing 12 phase symbols.

9. The method according to claim 6, wherein when the predetermined phase modulation mode is the 8-phase modulation π/8 8 PM, a value range of β is [0, 0.2], the symbol duration T=3/4 μs and a transmission rate is 4 Mbps, a protocol data unit in a BLE packet is mapped into 1 to 86 phase symbols, and a cyclic redundancy check in the BLE packet is mapped into 8 phase symbols, a preamble in the BLE packet is set to 36 bits of {001 101 001 101 001 101 001 101 001 101 001 101} and mapped into a phase sequence {+3π/8, −3π/8, +3π/8, −3π/8, +3π/8, −3π/8, +3π/8, −3π/8, +3π/8, −3π/8, +3π/8, −3π/8} containing 12 phase symbols, after an access address with—32 bits in the BLE packet is filled with 1 bit to form 33 bits, the 33 bits are mapped into 11 phase symbols.

10. A transmitter for constant envelope phase modulation of BLE, comprising:

a transmitting data processor configured to provide a binary data stream;

a phase mapper configured to divide the binary data stream into a plurality of groups of binary data, and map the groups of binary data into a plurality of phase symbols;

a phase waveform generator configured to generate a phase waveform p(t) by integrating a predetermined pulse function y(t), wherein a mathematical expression of the phase waveform p(t) is:

$$p(t) = \begin{cases} 0 & t < 0 \\ \dfrac{\int_0^t y(x)dx}{\int_0^T y(x)dx} & 0 \le t \le T \\ 1 & t > T \end{cases};$$

a phase signal generator configured to modulate the phase sequence into a phase signal by using the phase waveform;

a baseband signal generator configured to convert the phase signal into two baseband signals;

an RF signal generator configured to modulate the two baseband signals into two branching RF signals respectively, combine the two branching RF signals to generate a combined RF signal and amplify the combined RF signal by a power amplifier; and an antenna configured to transmit the amplified RF signal.

11. The transmitter according to claim 10, wherein a mathematical expression of the predetermined pulse function y(t) is:

$$y(t) = \begin{cases} \dfrac{1 + \cos\left[\dfrac{2\pi t}{T(1-\beta)} + \pi\right]}{2} & 0 \le t < \dfrac{T}{2}(1-\beta) \\ 1 & \dfrac{T}{2}(1-\beta) \le t \le \dfrac{T}{2}(1+\beta), \\ \dfrac{1 + \cos\left[\dfrac{2\pi(T-t)}{T(1-\beta)} + \pi\right]}{2} & \dfrac{T}{2}(1+\beta) < t \le T \end{cases}$$

wherein, 0≤β<1, T is a symbol duration and t is a time.

12. The transmitter according to claim 10, wherein a mathematical expression of the phase signal φ(t) is:

φ(t)=Σ$\theta_k$*p(t−k*T), wherein $\{\theta_k\}$ is the phase sequence, $\theta_k$ is the phase symbol, p(t) is the phase waveform, T is a symbol duration, t is a time, and k is a sequence number of the phase symbol.

13. The transmitter according to claim 10, wherein the baseband signal generator is configured to convert the phase signal into two baseband signals $I_B(t)$ and $Q_B(t)$ via a cosine function and a sine function respectively according to following equations, $I_B(t)=A*\cos[\varphi(t)], Q_B(t)=A*\sin[\varphi(t)]$, wherein φ(t) is the phase signal and A is a signal amplitude.

14. The transmitter according to claim 10, wherein every two bits in the binary data stream are divided into one group in a quadrature phase modulation π/4 QPM, and every three bits in the binary data stream are divided into one group in an 8-phase modulation π/8 8 PM.

15. The transmitter according to claim 14, wherein in the quadrature phase modulation π/4 QPM, the two bits divided into one group are denoted as $b_{2k}$ and $b_{2k+1}$ respectively, and a mapping relationship between the binary data stream $\{b_n\}$ and the phase sequence $\{\theta_k\}$ is that:

when $b_{2k}$ and $b_{2k+1}$ are 0 and 0 respectively, the mapped phase symbol $\theta_k$ is $+\pi/4$, when $b_{2k}$ and $b_{2k+1}$ are 0 and 1 respectively, the mapped phase symbol $\theta_k$ is $+3\pi/4$, when $b_{2k}$ and $b_{2k+1}$ are 1 and 1 respectively, the mapped phase symbol $\theta_k$ is $-3\pi/4$, and when $b_{2k}$ and $b_{2k+1}$ are 1 and 0 respectively, the mapped phase symbol $\theta_k$ is $-\pi/4$, in the 8-phase modulation $\pi/8$ 8 PM, the three bits divided into one group are denoted as $b_{3k}$, $b_{3k+1}$, and $b_{3k+2}$, a mapping relationship between the binary data stream $\{b_n\}$ and the phase sequence $\{\theta_k\}$ is that:

when $b_{3k}$, $b_{3k+1}$, and $b_{3k+2}$ are 0, 0, and 0 respectively, the mapped phase symbol $\theta_k$ is $+\pi/8$, when $b_{3k}$, $b_{3k+1}$, and $b_{3k+2}$ are 0, 0, and 1 respectively, the mapped phase symbol $\theta_k$ is $+3\pi/8$, when $b_{3k}$, $b_{3k+1}$, and $b_{3k+2}$ are 0, 1, and 1 respectively, the mapped phase symbol $\theta_k$ is $+5\pi/8$, when $b_{3k}$, $b_{3k+1}$, and $b_{3k+2}$ are 0, 1, and 0 respectively, the mapped phase symbol $\theta_k$ is $+7\pi/8$, when $b_{3k}$, $b_{3k+1}$, and $b_{3k+2}$ are 1, 1, and 0 respectively, the mapped phase symbol $\theta_k$ is $-7\pi/8$, when $b_{3k}$, $b_{3k+1}$, and $b_{3k+2}$ are 1, 1, and 1 respectively, the mapped phase symbol $\theta_k$ is $-5\pi/8$, when $b_{3k}$, $b_{3k+1}$, and $b_{3k+2}$ are 1, 0, and 1 respectively, the mapped phase symbol $\theta_k$ is $-3\pi/8$, and when $b_{3k}$, $b_{3k+1}$, and $b_{3k+2}$ are 1, 0, and 0 respectively, the mapped phase symbol $\theta_k$ is $-\pi/8$.

16. A transmitter for constant envelope phase modulation of BLE, comprising:

a transmitting data processor configured to provide a binary data stream;

a phase mapper configured to divide the binary data stream into a plurality of groups of binary data, and map the groups of binary data into a plurality of phase symbols;

a digital phase waveform generation unit configured to generate a digital phase waveform p(t) by integrating a predetermined pulse function y(t), wherein a mathematical expression of the digital phase waveform p(t) is:

$$p(t) = \begin{cases} 0 & t < 0 \\ \dfrac{\int_0^t y(x)dx}{\int_0^T y(x)dx} & 0 \le t \le T \\ 1 & t > T \end{cases};$$

a digital phase signal generator configured to modulate the phase sequence into a digital phase signal by using the digital phase waveform, or generate the digital phase signal based on a pre-stored waveform data;

a digital baseband signal generator configured to convert the digital phase signal into two digital baseband signals;

a digital-to-analog converter configured to convert the two digital baseband signals into two analog baseband signals respectively;

an RF signal generator configured to modulate the two analog baseband signals into two branching RF signals respectively, combine the two branching RF signals to generate a combined RF signal and amplify the combined RF signal by a power amplifier; and an antenna configured to transmit the amplified RF signal.

17. The transmitter according to claim 16, wherein a mathematical expression of the predetermined pulse function y(t) is:

$$y(t) = \begin{cases} \dfrac{1+\cos\left[\dfrac{2\pi t}{T(1-\beta)} + \pi\right]}{2} & 0 \le t < \dfrac{T}{2}(1-\beta) \\ 1 & \dfrac{T}{2}(1-\beta) \le t \le \dfrac{T}{2}(1+\beta), \\ \dfrac{1+\cos\left[\dfrac{2\pi(T-t)}{T(1-\beta)} + \pi\right]}{2} & \dfrac{T}{2}(1+\beta) < t \le T \end{cases}$$

wherein, $0 \le \beta < 1$, T is a symbol duration and t is a time.

18. The transmitter according to claim 16, wherein a mathematical expression of the digital phase signal φ(t) is:

φ(t)=Σθ_k*p(t−k*T), wherein $\{\theta_k\}$ is the phase sequence, p(t) is the phase waveform, T is a symbol duration, t is a time, and k is a sequence number of the phase symbol.

19. The transmitter according to claim 16, wherein the digital baseband signal generator is configured to convert the digital phase signal into two digital baseband signals by means of a cosine function and a sine function respectively according to following equations, $I_B(t)=A*\cos[\varphi(t)], Q_B(t)=A*\sin[\varphi(t)]$, wherein φ(t) is the digital phase signal and A is a signal amplitude.

20. The transmitter according to claim 16, wherein every two bits in the binary data stream are divided into one group in a quadrature phase modulation π/4 QPM, and every three bits in the binary data stream are divided into one group in an 8-phase modulation π/8 8 PM.

* * * * *